United States Patent [19]

Corporon et al.

[11] Patent Number: 5,549,349

[45] Date of Patent: Aug. 27, 1996

[54] SIDE IMPACT PROTECTION SYSTEM

[75] Inventors: Max A. Corporon, Bloomfield Hills; Tim J. Wehner, Auburn Hills; Ashutosh Gunderia, Sterling Heights, all of Mich.

[73] Assignee: Chrysler Corporation, Auburn Hills, Mich.

[21] Appl. No.: 432,480

[22] Filed: May 1, 1995

[51] Int. Cl.$^6$ .................................................. B62D 25/20
[52] U.S. Cl. ........................ 276/188; 296/204; 296/209
[58] Field of Search .................................. 296/186–189, 296/203, 204, 209

[56] References Cited

U.S. PATENT DOCUMENTS

| | | |
|---|---|---|
| 2,872,241 | 2/1959 | Shelden . |
| 2,903,042 | 9/1959 | Thornburg . |
| 3,279,816 | 10/1966 | Issigonis . |
| 3,357,736 | 12/1967 | McCarthy . |
| 3,743,347 | 7/1973 | Shaw . |
| 3,776,588 | 12/1973 | Sobajima et al. . |
| 3,791,693 | 2/1974 | Hellriegel et al. . |
| 3,837,668 | 9/1974 | Barenyi et al. . |
| 3,882,970 | 5/1975 | Newman, Jr. . |
| 3,885,810 | 5/1975 | Chika . |
| 3,944,276 | 3/1976 | deRosa et al. . |
| 4,017,117 | 4/1977 | Eggert, Jr. . |
| 4,231,607 | 11/1980 | Bohlin .................................. 296/63 |
| 4,272,103 | 6/1981 | Schmid et al. ....................... 280/751 |
| 4,307,911 | 12/1981 | Pavlik . |
| 4,396,220 | 8/1983 | Dieckmann et al. . |
| 4,438,969 | 3/1984 | Kamijo et al. . |
| 4,449,749 | 5/1984 | Eger ..................................... 296/194 |
| 4,451,078 | 5/1984 | Maeda ................................. 296/188 |
| 4,457,555 | 7/1984 | Draper ................................. 296/186 |
| 4,462,633 | 7/1984 | Maeda ................................. 296/188 |
| 4,512,604 | 8/1985 | Maeda et al. . |
| 4,558,900 | 12/1985 | Nagata ................................. 296/152 |
| 4,709,943 | 12/1987 | Yoshimura et al. ................. 280/751 |
| 4,747,636 | 5/1988 | Harasaki et al. ................. 280/756 X |
| 4,786,100 | 11/1988 | Kleemann et al. . |
| 4,850,638 | 7/1989 | Vollrath et al. ..................... 296/187 |
| 4,852,936 | 8/1989 | Greene et al. ....................... 296/178 |
| 4,934,751 | 6/1990 | Shimoda .............................. 296/188 |
| 4,958,884 | 9/1990 | Gold .................................... 296/188 |
| 4,969,680 | 11/1990 | Shimoda . |
| 5,000,509 | 3/1991 | Sinnhuber et al. ................. 296/188 |
| 5,018,780 | 5/1991 | Yoshii et al. ................... 296/204 X |
| 5,039,160 | 8/1991 | Garnweidner et al. ............. 276/189 |
| 5,110,176 | 5/1992 | Curtis .................................. 296/188 |
| 5,238,286 | 8/1993 | Tanaka et al. ......................... 296/70 |
| 5,290,084 | 3/1994 | Sinnhuber ........................... 296/68.1 |
| 5,328,226 | 7/1994 | Thomas .............................. 296/68.1 |
| 5,346,275 | 9/1994 | Enning et al. ...................... 296/195 |
| 5,348,342 | 9/1994 | Haland et al. ...................... 280/730 |
| 5,354,115 | 10/1994 | Esaki .................................. 296/203 |
| 5,364,128 | 11/1994 | Ide ...................................... 280/784 |

FOREIGN PATENT DOCUMENTS

| | | |
|---|---|---|
| 235635 | 2/1987 | European Pat. Off. . |
| 1026800 | 2/1953 | France . |
| 1151659 | 8/1957 | France .............................. 296/204 |
| 7240914 | 11/1972 | France . |
| 74-01790 | 1/1974 | France . |
| 2424146 | 4/1978 | France . |

(List continued on next page.)

*Primary Examiner*—Dennis H. Pedder
*Attorney, Agent, or Firm*—G. Andrew Barger

[57] ABSTRACT

A side impact protection system for a vehicle is provided. The vehicle comprises a side impact zone and further comprises laterally spaced apart sills extending longitudinally of the vehicle. The laterally spaced apart sills have sill sealing flanges projecting vertically therefrom. The side impact protection system includes a continuous, linearly extending cross member disposed laterally in the vehicle for transferring load and redistributing energy away from an impact side of the vehicle. The linearly extending cross member extends between, and is in abutment with, the laterally spaced apart sills and the corresponding sill sealing flanges thereby allowing the linearly extending cross member to transfer load and redistribute energy immediately upon side impact of the vehicle.

6 Claims, 3 Drawing Sheets

FOREIGN PATENT DOCUMENTS

| | | |
|---|---|---|
| 2551892 | 11/1975 | Germany . |
| 2444018 | 3/1976 | Germany ................. B60R 21/02 |
| 3151861 | 7/1983 | Germany . |
| 3425776 | 1/1986 | Germany ................... B60R 5/00 |
| 3111045 | 1/1988 | Germany . |
| 63-74718 | 4/1968 | Japan ......................... B60J 5/04 |
| 269679 | 10/1989 | Japan ................................ 296/204 |
| 37085 | 2/1990 | Japan ................................ 296/204 |
| 77042893 | 4/1977 | Sweden . |
| 927275 | 5/1963 | United Kingdom ............... 296/204 |

SIDE IMPACT PROTECTION SYSTEM

BACKGROUND OF THE INVENTION

1. Field of the Invention

The present invention relates, generally, to vehicle side impact performance systems. In particular, the present invention relates to a side impact protection system that is disposed within an underbody of a vehicle. And, more particularly, relates to a structural side impact protection system that is disposed under a rear passenger seat riser portion of a vehicle floor pan.

2. Description of the Related Art

Current vehicle structural designs employ a laterally disposed cross member that has a primary purpose of providing structural support during a side impact collision. When disposed in the rear of the vehicle, the cross member is commonly placed under the rear seat riser or is integrally formed therein. Manufacturing limitations require the cross members to be formed in the general shape of various rear seat and underbody components. Such limitations may degrade side impact performance since the cross member cannot be a linear piece. The governing formation component that determines the shape of the cross member is usually the rear passenger seat riser portion of the vehicle's floor pan.

Typically the outboard ends of the rear seat cushion that are connected to the rear seat riser are contoured at the door sill to follow the shape of the seat cushion. Similarly the floor pan will also follow the contoured shape of the rear seat cushion and rear seat riser thereby allowing proper ingress and egress of passengers who sit in the rear of the vehicle. By forming the shape of the floor pan to follow the contour of the rear seat cushion and seat riser, the stamping of the floor pan is greatly complicated.

More importantly, however, for side impact system purposes, the top edge of the cross member that extends laterally across the vehicle cannot be a straight piece that extends from sill to sill in the vehicle. The non-linear shape of the cross member decreases the efficiency of transferring the load from the impact side of the vehicle to the non-impact side of the vehicle when a collision occurs. Another limitation in prior art designs is that the non-linear shape of the cross member results in excessive deformation, in the form of buckling, during a side impact. Such deformation of the load bearing cross member creates undesirable energy absorption that may cause vehicle intrusion upon side impact rather than energy absorption via transfer of load to the non-impact side of the vehicle.

A further limitation in prior art designs is that the contoured cross members used cannot extend from sill to sill in the vehicle because of their arching nature. Each vehicle sill typically abuts a corresponding inner door panel, which in turn is attached to a vehicle outer door panel. The inability to extend the cross member from sill to sill prevents the cross member from receiving and transferring a load immediately upon impact. A still further limitation in prior art designs is that the inability to have the cross member extend from sill to sill in the vehicle also prevents the cross member from being raised vertically into industry standard side impact crash zones when the height of the vehicle sills are raised.

SUMMARY OF THE INVENTION

The present invention provides a side impact protection system for a vehicle. The vehicle includes a planar region and a side impact zone. The vehicle further comprises laterally spaced apart sills extending longitudinally in the vehicle, the laterally spaced apart sills each having a corresponding sill sealing flange projecting vertically therefrom. The side impact protection system comprises a continuous, linearly extending cross member disposed laterally in the vehicle for transferring load from an impact side of the vehicle to a non-impact side of the vehicle. The linearly extending cross member extends between, and is in abutment with, the laterally spaced apart sills and the corresponding sill sealing flanges thereby allowing the linearly extending cross member to transfer load immediately upon side impact of the vehicle.

One objective of the present invention is to provide a side impact protection system that comprises a cross member having a substantially linear shape such that load is transferred from an impact side of a vehicle to a non-impact side of the vehicle.

Another objective of the present invention is to provide a linear shaped cross member that will redistribute energy away from the impact side of the vehicle.

A further advantage of the present invention is that a side impact system is provided that comprises a cross member that extends from sill to sill in the vehicle thereby allowing the linearly extending cross member to transfer energy immediately upon side impact.

Another advantage of the present invention is that a side impact system is provided that comprises a cross member that intersects a side impact zone.

Other objects, features, and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
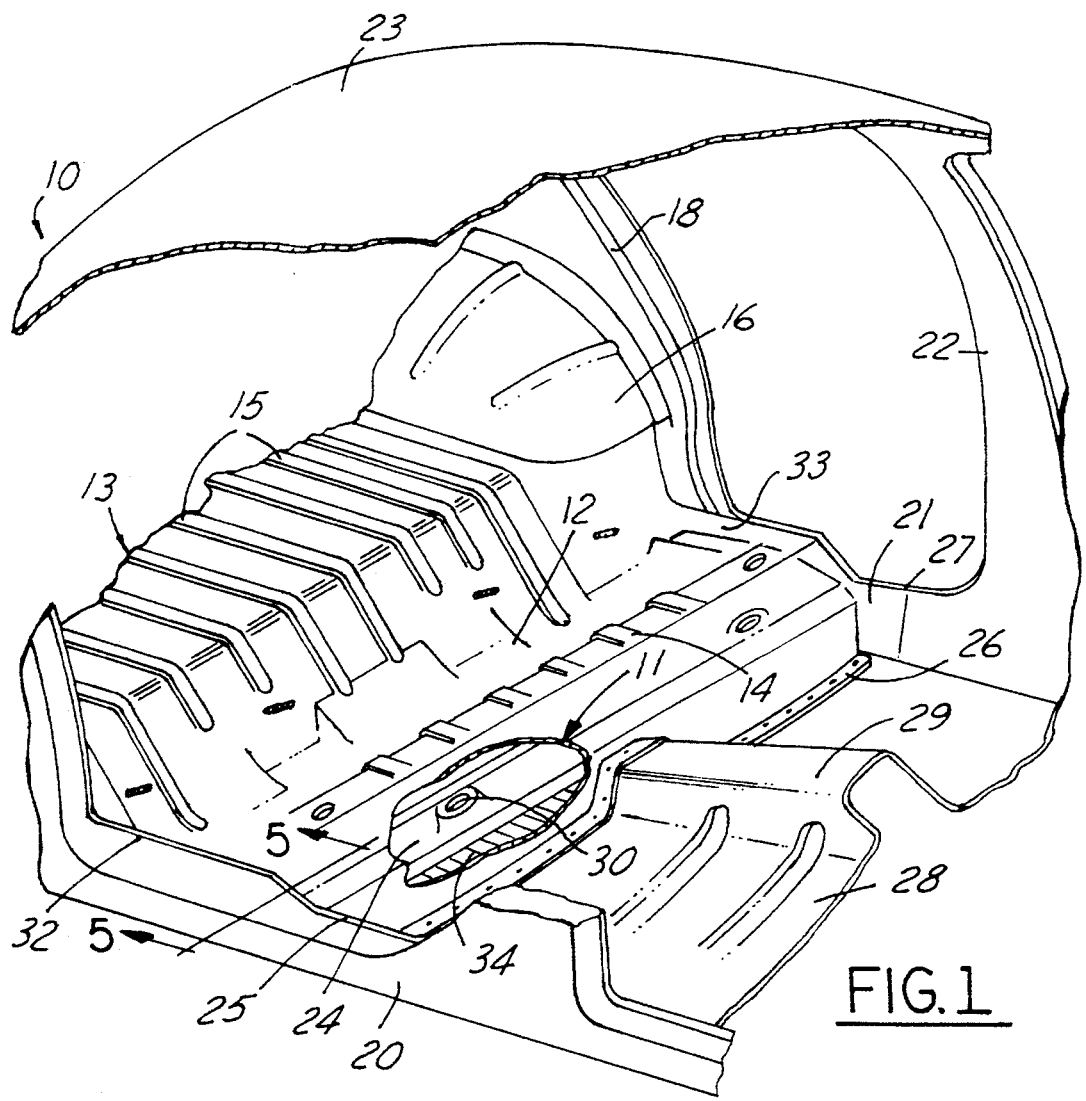
FIG. 1 is a partial cut away view of a vehicle showing the side impact system of the present invention.

A side impact system 11 of a vehicle 10 is shown in FIG. 1. A floor pan 13 is shown having a plurality of raised ridges 15 projecting outward therefrom. A seating portion 12 of floor pan 13 is provided whereon a seat (not shown) can be placed. The floor pan 13 is formed in a generally convex fashion and includes a seat riser portion 14. A seat riser reinforcement 34 is also provided for supporting the seat riser portion 14 of the floor pan 13. A wheel housing 16, wherein a vehicle wheel is disposed, abuts against the floor pan 13. The vehicle 10 further comprises a quarter panel 18 that is attached to at least one body panel (not shown) on each side of the vehicle 10. A vehicle support pillar 22 is also shown in FIG. 1. The pillar 22 has an opposing pillar (not shown) placed on the other side of the vehicle 10. The pillars provide support for the vehicle roof 23.

The vehicle 10 further comprises laterally spaced apart sills 20, 21 that extend longitudinally of the vehicle 10. The sills 20, 21 have sill sealing flanges 25, 27 projecting vertically therefrom. A continuous, linearly extending cross member 24 is disposed laterally in the vehicle 10 for transferring load from an impact side of the vehicle 10 to a non-impact side of the vehicle 10. The linear shape of the cross member 24 also redistributes energy from the impact away from the impact side impact side of the vehicle 10 such that the energy is absorbed by the quarter panels, pillars, sills, and the parts that comprise the vehicle under body.

The linearly extending cross member 24 extends between, and is in abutment with, the laterally spaced apart sills 20, 21 and the corresponding sill sealing flanges 25, 27. Such extension and abutment allows the cross member 24 to transfer load immediately upon side impact of the vehicle 10. Further shown in FIG. 1 is a foot well portion 28 of floor pan 13. The foot well portion 28 has a component tunnel 29 disposed therein whereby clearance space for underfloor components is provided.

Figure 2:
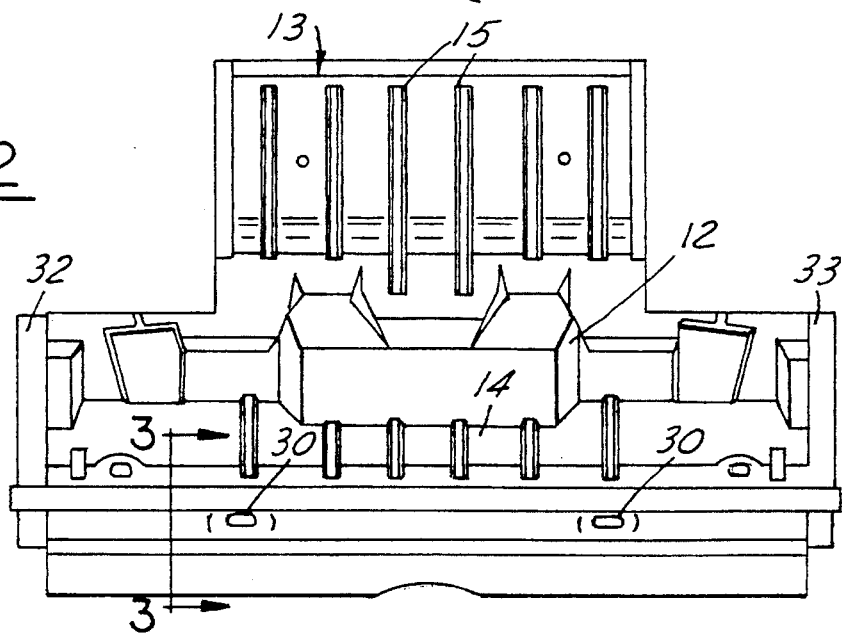
FIG. 2 is a plan view of the seat riser used in the side impact protection system of the present invention.

As is best shown in FIGS. 1 and 2, overlapping portions 32, 33 of the floor pan 13 are also provided in the present invention. The overlapping portions 32, 33 of the floor pan 13 run generally parallel with the laterally spaced apart sills 20, 21 on each side of the vehicle 10. Moreover, seat cushion attachment apertures 30 are provided and disposed in the seat riser portion 14 of floor pan 13. The seat attachment apertures 30 provide means for securing a seat member to the floor pan 13 via fasteners such as bolts or screws.

Figure 3:
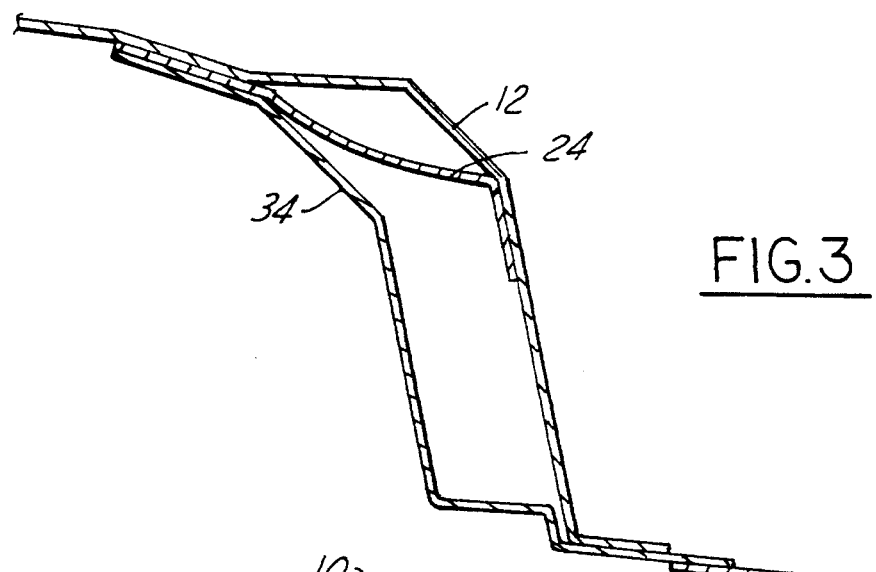
FIG. 3 is a cross sectional view, taken along line 3—3 of FIG. 2 viewed in the direction of the arrows.
Figure 4:
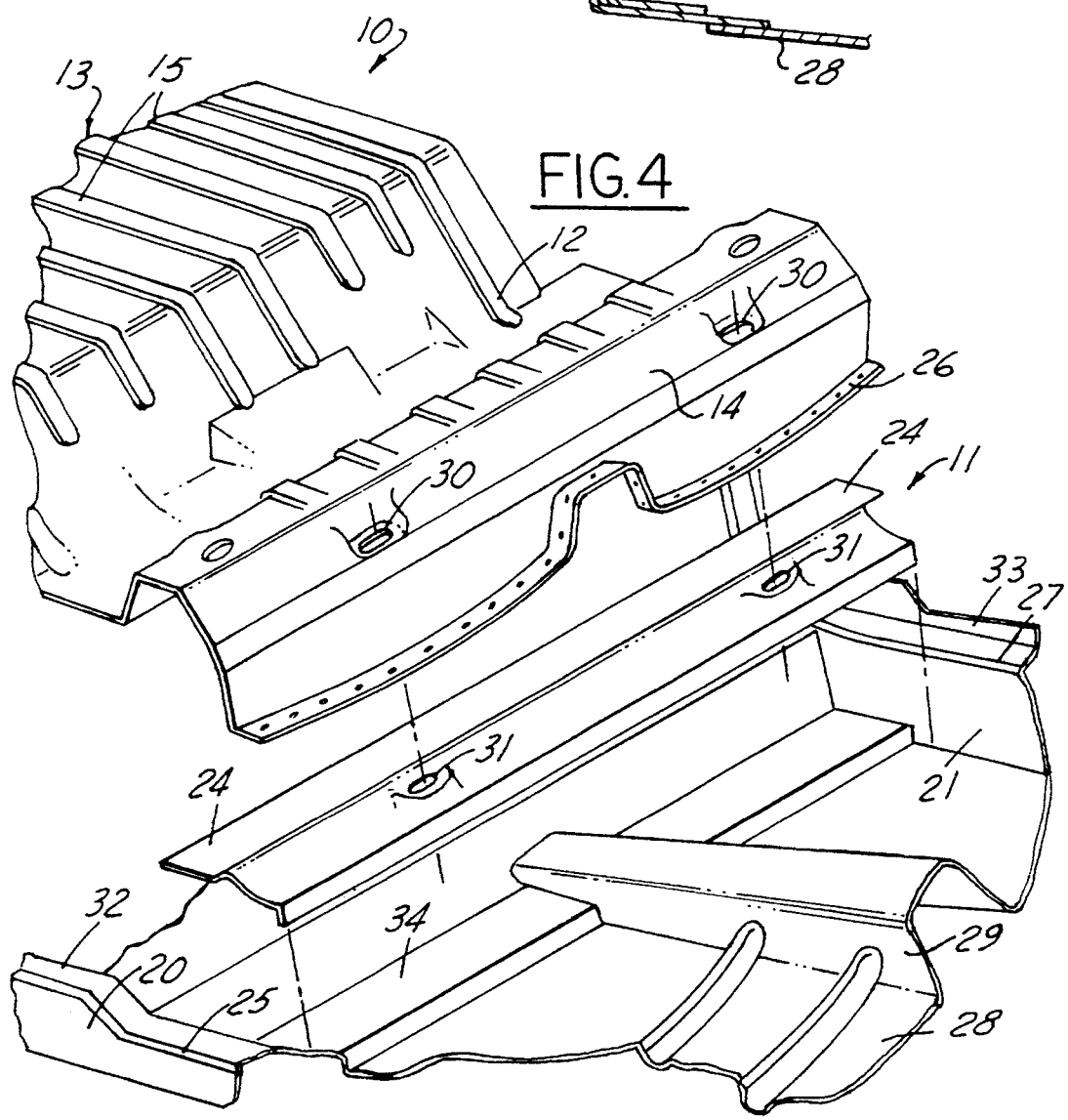
FIG. 4 is an exploded view of the side impact protection system of the present invention.

Referring now to FIGS. 3 and 4, a cross section of the seating portion 12 of floor pan 13, cross member 24, and a seat riser reinforcement 34 is shown. The cross member 24 is in abutment with the floor pan 13 at the seating portion 12 and the seat riser reinforcement 34. The seating portion 12 of the floor pan 13 and seat riser reinforcement 34 form a generally rectangular section that extends laterally between the sills 20, 21. The floor pan 13 and seat riser reinforcement 34 form an upper and a lower apex at their abutting points. The lower apex is in abutment with the foot well portion 28 of floor pan 13.

As shown in FIG. 4, the cross member 24 is linear and extends laterally across the vehicle 10 such the cross member 24 is in abutment with the laterally spaced apart sills 20, 21. In the preferred embodiment the cross member 24 is disposed underneath the seat riser portion 14 of floor pan 13. It is understood, however, that the cross member 24 could also be integrally formed with, or disposed above, the seat riser portion 14 of floor pan 13.

Figure 5:
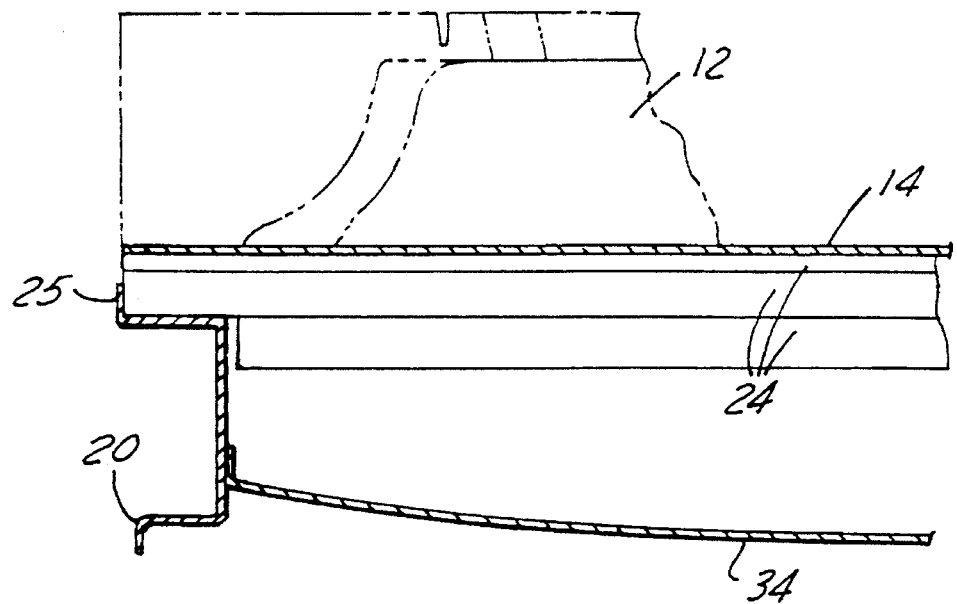
FIG. 5 is a partial cross sectional view, taken along line 5—5 of FIG. 1 viewed in the direction of the arrows and showing the cross member in abutment with the sill and sill flange extension.

As best seen in FIG. 5, the cross member 24 is in abutment with the sill flanges 25, 27 and the laterally spaced sills 20, 21. The seat riser reinforcement 34 is disposed below the cross member 24 in the vehicle 10.

Figure 6:
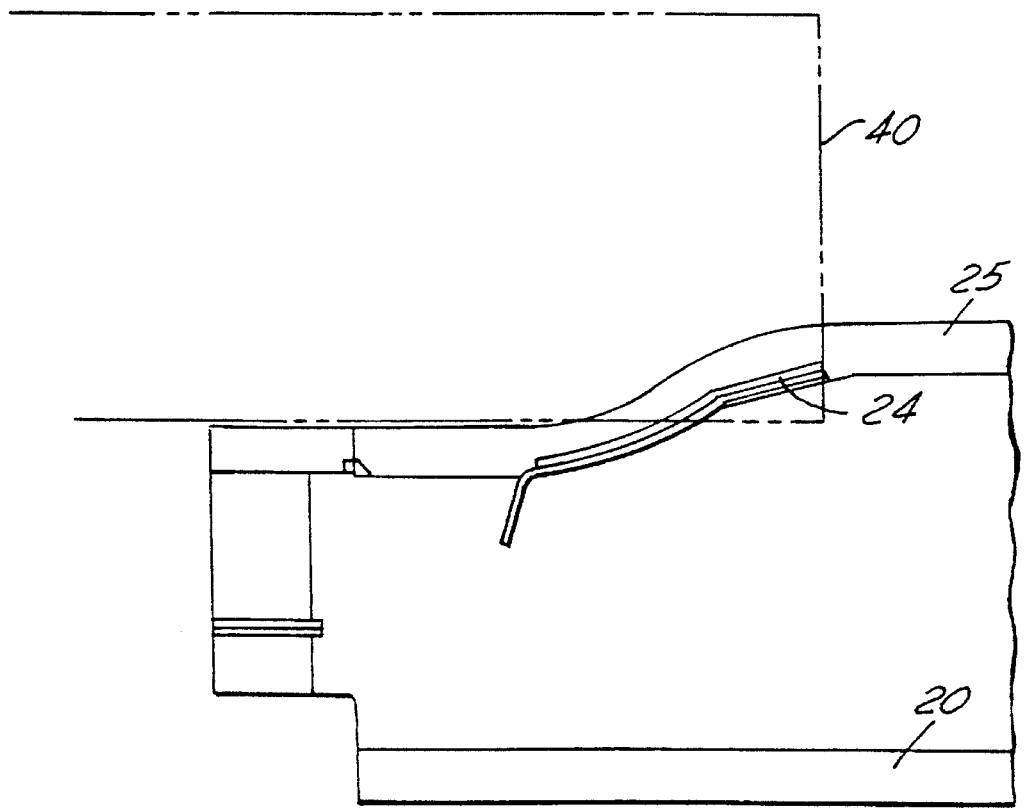
FIG. 6 is a diagrammatic side view of the side impact zone of the present invention.

Referring to FIG. 6, a vehicle side impact zone 40 is shown. The side impact zone 40 is a planar region that is intersected by the cross member 24. Such intersection of the impact zone 40 by the cross member 24 allows for a transfer of load via the cross member 24 upon the occurrence of a side impact collision. Moreover, the intersection of the cross member with the side impact zone 40 also aides in redistributing energy from the impact away from the side impact zone 40 such that the energy is absorbed by vehicle components away from the side impact zone 40.

To allow for an intersection of the side impact zone 40 by the linearly extending cross member 24 in the present invention, the sills 20, 21 are raised vertically within the vehicle 10. Since the cross member 24 extends between and is in abutment with the sills 20, 21, when the sills 20, 21 are raised, the cross member 24 is also raised thereby allowing for intersection of the impact zone 40.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. In a side impact protection system for a vehicle, the vehicle comprising a side impact zone, laterally spaced apart sills extending longitudinally in the vehicle, each laterally spaced apart sill having a corresponding sill sealing flange projecting vertically therefrom, a floor pan, a seat riser, and a seat riser reinforcement disposed between the laterally spaced apart sills, the side impact protection system comprising:

a continuous, linearly extending cross member disposed laterally in the vehicle for transferring load and redistributing energy away from an impact side of the vehicle, the cross member extending between, and is in abutment at each end with one of the laterally spaced apart sills and the corresponding sill sealing flange thereby allowing the cross member to transfer load and redistribute energy immediately after the load and the energy is imparted to a sill and corresponding sill sealing flange on the impact side of the vehicle, the cross member being in abutment with the floor pan and the seat riser reinforcement in between each end so that upon side impact of the vehicle energy is redistributed to both the floor pan and the seat riser.

2. The side impact protection system of claim 1 wherein the linearly extending cross member and one of the laterally spaced apart sills and one of the corresponding flanges intersect the side impact zone.

3. The side impact protection system of claim 2 wherein the seat riser is disposed rearward in the vehicle.

4. The side impact protection system of claim 3 wherein the linearly extending cross member is disposed underneath the seat riser in the vehicle.

5. In a side impact protection system for a vehicle, the vehicle comprising a side impact zone, a floor pan having a foot well portion disposed therein, a rear seat riser, laterally spaced apart sills extending longitudinally in the vehicle, each laterally spaced apart sill having a corresponding sill sealing flange projecting vertically therefrom, and a seat riser reinforcement disposed between the sills, the side impact protection system comprising:

a continuous, linearly extending cross member fixedly attached to and disposed underneath the rear seat riser for transferring load and redistributing energy away from an impact side of the vehicle, the cross member extending between, and is in abutment with, the laterally spaced apart sills and each corresponding sill sealing flange thereby allowing the cross member to transfer load and redistribute energy immediately after the load and the energy is imparted to a sill and corresponding sill sealing flange on the impact side of the vehicle, the cross member being in abutment with the floor pan and the seat riser reinforcement in between each end so that upon side impact of the vehicle energy is redistributed to both the floor pan and the seat riser, the cross member and the laterally spaced apart sills being located in the vehicle such that the cross member intersects the side impact zone; whereby the floor pan and the seat riser reinforcement form an upper apex at an abutting point and a lower apex at an abutting point, the lower apex being in abutment with the foot well portion of the floor pan.

6. The side impact protection system of claim 5 wherein the seat riser is disposed rearward in the vehicle.

* * * * *